Patented Jan. 6, 1948

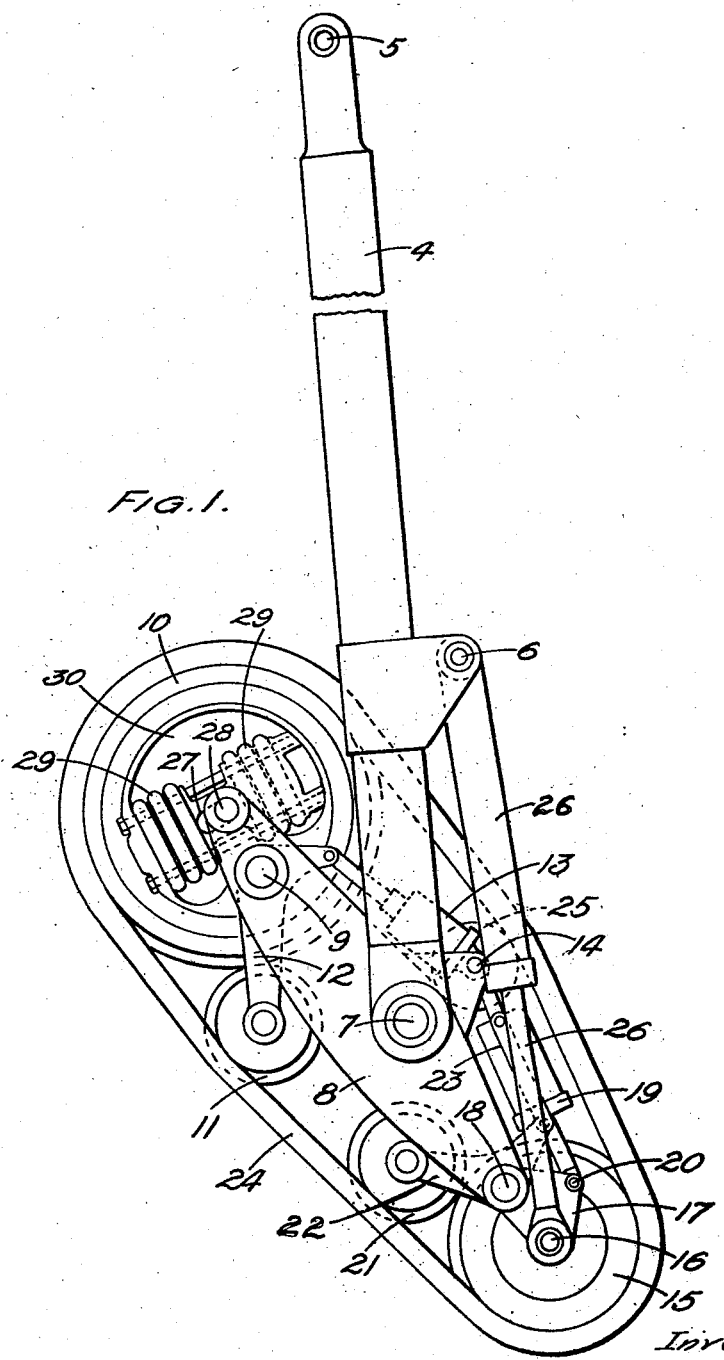

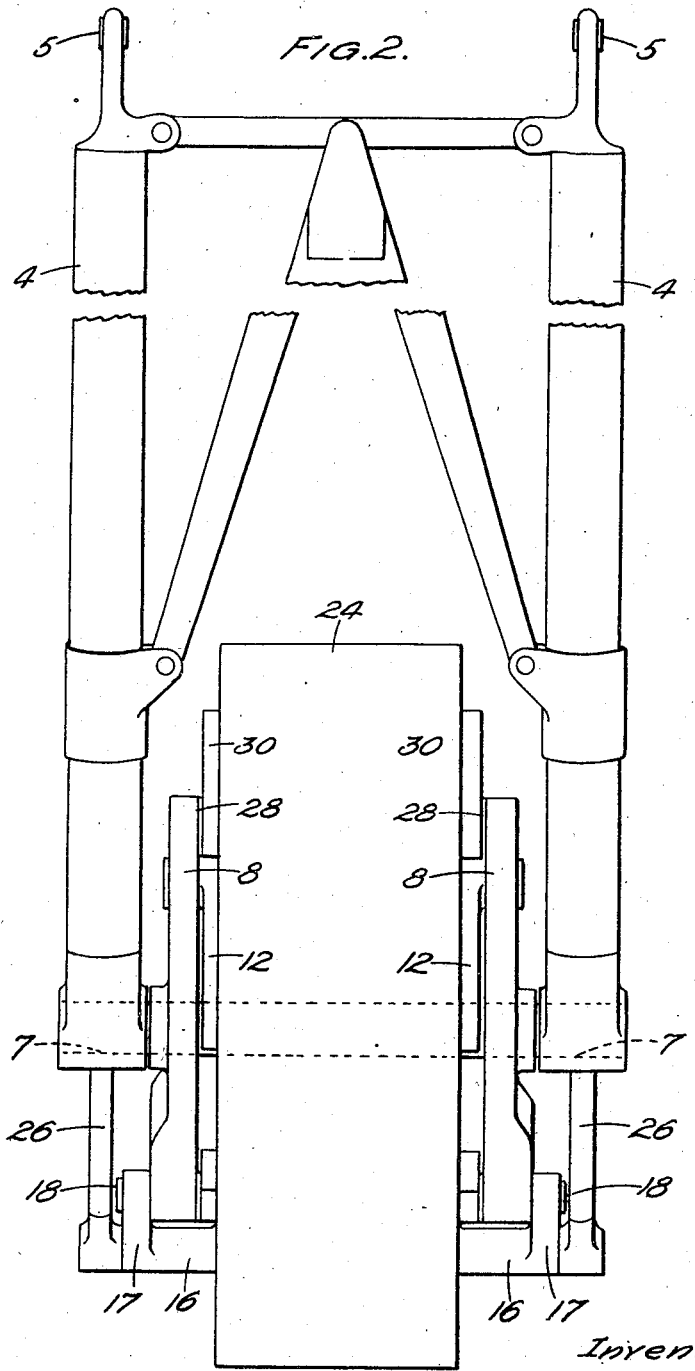

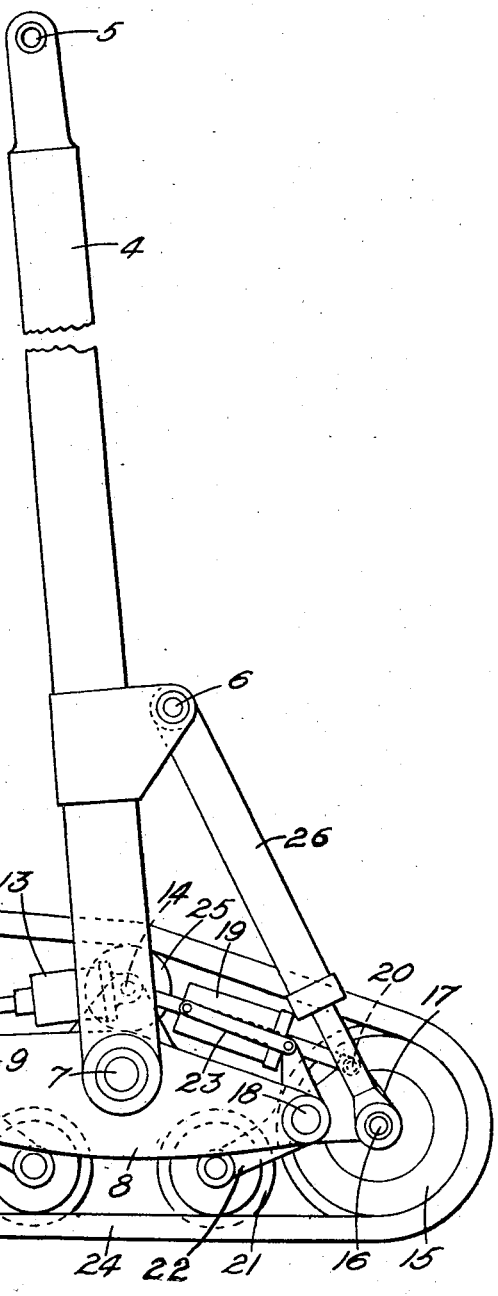

2,433,830

UNITED STATES PATENT OFFICE 2,433,830

ENDLESS TRACK LANDING ELEMENT AND MEANS FOR MOUNTING THE SAME ON AIRCRAFT

George Herbert Dowty, Cheltenham, England

Application November 25, 1944, Serial No. 565,116
In Great Britain November 23, 1943

Section 1, Public Law 690, August 8, 1946
Patent expires November 23, 1963

6 Claims. (Cl. 244—100)

The present invention relates to endless track landing elements and to the manner of connecting endless track landing elements to aircraft.

The present invention consists in an endless track landing element adapted and arranged for connection to an aircraft and subject to initial yield against resistance for change of attitude in pitch under the influence of landing load, further characterized by the provision of resiliently yieldable track band mounting means operating to provide the requisite resilience for taxying.

Expressed another way the invention consists in an endless track landing element which is internally or inherently sprung to provide resilient resistance to shock transmitted thereto under taxying conditions, the landing element itself embodying a pivot for a connection to the aircraft so that the landing element is so supported that it hangs downwardly in trail of the pivot with freedom of attitude in the pitching sense against resistance operating to restrain tail end raising movement of the landing element under the influence of landing load. The restraining influence against the change of attitude in pitch may merely be resistance introduced through hydraulic or pneumatic dash-pot or equivalent mechanism, but in all cases it preferably involves also a certain degree of resilience tending to trim the landing element towards its unloaded tail down position. The resistance effect produced by the dash-pot may be of a differential nature according to the direction of travel of the landing element as it changes its pitch attitude. Thus, for example, in a preferred embodiment the tail end of the landing element may be adapted to be considerably restricted in its upward swinging movement so as to dissipate the energy of landing load, the restriction effect being much less on the occurrence of any relief of load tending to restore the landing element to its tail down position, either resiliently or under the influence of its own weight and load disposition in relation to the centre of gravity of the landing element.

Provisions may be made, for instance, by a remotely controllable jack or equivalent mechanism, for trimming the landing element positively in its pitching sense.

In order that it may be clearly understood and readily carried into effect the invention is hereinafter described with reference to the accompanying diagrammatic drawings of which:

Figure 1 illustrates an endless track landing element according to the present invention and a mounting for connecting it to the aircraft structure, the position in which the parts are shown in this figure being representative of a completely unloaded condition such as occurs when the aircraft is air-borne.

Figure 2 is a front end elevation looking on the lefthand side of Figure 1.

Figure 3 corresponds to Figure 1 but shows the mounting in a taxying position with the endless track landing element swung up at its tail end under the influence of landing load.

In the drawings the reference numeral 4 is directed to the main struts of the mounting which are laterally spaced and suitably interbraced. It can be assumed that in almost all cases the mounting will be retractable as a whole, partially or completely into stowage space provided in the aircraft, and for that purpose the mounting is retractable about the retraction pivot anchorage 5, by which the mounting is connected to a suitable strong point on the air-frame. Retraction and extension can be performed by a fluid-actuated jack or other suitable means convenient for operating on the pivot 6.

A main track mounting pivot 7 is provided at the foot of the mounting on which the frame 8 of the endless track is free to swing in the pitching sense. The frame 8 is cut away internally or is constituted by laterally spaced longitudinal members, and at its front end the frame 8 of the endless track unit mounts a transverse support pivot 9 for the hub part 30 whereon is journalled the front end track bearing roller 10 which preferably is internally sprung as will later be understood. Front end track loading rollers are represented by the reference numeral 11, and these front end track loading rollers 11 are carried by laterally spaced bellcrank levers 12, one at each side of the front end track bearing roller 10. The short arms of the bellcrank levers are connected each by a telescopic resilient tension shock absorber 13 to a fixed pivot 14 at the top of the frame 8. The rear end track bearing roller is represented by the reference numeral 15 and is mounted on the spindle 16 which is carried by link plates 17 pivoted one at each side of the frame 8. The link plates are connected to the pivot 18 on the main frame 8 and a telescopic resilient shock absorber 19 operates in compression between the fixed pivot 14 and a pivot 20 on the link plates 17. Rear end track loading rollers 21 are connected by laterally spaced bellcrank levers 22 to the pivot 18, the short arms of the bellcrank levers being connected by pivot links 23 to the cylinder of the shock absorber 19.

It should be noted particularly that the shock absorber 13 is a tension shock absorber operating to swing the front end track loading roller bellcrank 12 clockwise about its pivot 9 for track tensioning purposes as will later be understood. On the other hand the shock absorber 19 is of the compression type so that the connection of its plunger to the pivot 20 on the link plates 17 ensures a downward loading on the spindle 16 of the rear end track bearing roller 15, and at the same time the connection of the bellcrank lever 22 through the links 23 with the cylinder of the shock absorber 19 ensures that the bellcrank lever 22 is swung anti-clockwise about the pivot 18 to apply a track tensioning load on the endless track band. If the track bearing rollers 10 and 15 extend right across the full width of the endless track unit the shock absorbers 13 and 19 need to be duplicated one at each side of the frame, but if the track bearing rollers 10 and 15 are each constituted by laterally spaced elements with an appreciable space between them the layout may be simplified by the employment of single shock absorbers 13 and 19 with a corresponding simplification of the linkage.

The track bearing rollers 10 and 15 and the track loading rollers 11 and 21 virtually define a resiliently deformable frame about which the endless track band 24 is engaged. The endless track band 24 preferably possesses some considerable inherent resilience, and is engaged under tension which may be further stressed by the roller 25 spring loaded upwardly at the top of the frame 8 to take up any slack which may develop in the track band 24 under load in operating conditions. In accordance with technique prevailing at the present time the track band 24 is formed of rubber or synthetic rubber reinforced by steel wire, but with higher landing speeds than those now prevailing and/or with heavier aircraft imposing greater loads on the landing elements, steel track bands may become necessary.

It will now be understood that the endless track 24 is resiliently supported on the frame 8 and the resilience is designed to provide that required effectually to smooth out the shocks which would otherwise be transmitted to the air-frame when the aircraft is taxying with the endless track unit in the position in which it is seen in Figure 3.

By comparison of Figure 1 with Figure 3 it will be seen that the endless track unit is loaded tail downwardly in the pitching sense with the parts of the mounting as seen in Figure 1 corresponding to the condition which occurs with the aircraft air-borne, whereas in Figure 3 the endless track unit has been substantially levelled out by raising its tail end in the pitching sense. Loading of the endless track unit to the tail down attitude is achieved by the combined dash-pot and track trimmer strut represented by the reference numeral 26, which strut 26 operates between the pivot 6 or some other convenient anchorage and some other convenient point such as the rear end track bearing roller spindle 16. The combined dash-pot and track trimmer strut 26 combines a degree of resilience with hydraulic damping action, the arrangement preferably being such that telescopic closure of the strut 26 under the influence of load tending to level out the endless track landing element as the aircraft lands is resisted hydraulically, and the resilience is selected in design to return the endless track landing element to its tail down position sufficiently rapidly for operational requirements with track travel in extension substantially undamped in its hydraulic sense. Generally the requirements are that there should be quite a definite resilience in the strut 26, but that resilience is not of such a high order as that provided for by the resilient deformation of the track unit under the influence of taxying load. Conversely, however, the hydraulic or other damping action resisting closure of the strut 26 is of a high order of resistance. The shock absorbers 13 and 19 on the other hand offer strong resilient resistance to deformation under load, but are heavily damped hydraulically or otherwise against excessively rapid rebound action on relief of load.

It was previously suggested that in preferred embodiments of the invention the front end track bearing roller 10 is internally sprung. Such an arrangement may not be essential in the case of commercial air liners operating under ideal landing and take-off conditions where concrete runways are available, but in many cases such ideal conditions cannot be depended upon. Therefore, in preferred embodiments the front end track bearing roller 10 swings under the influence of landing and taxying loads in a short arc about its transverse support pivot 9 to an extent defined by the limits of the slot 27 which is arcuate about the pivot 9. It should be noted, however, that movement of the front end track bearing roller 10 about the pivot 9 is swinging movement and not rotational movement. Rotation of the front end track bearing roller 10 occurs about the hub spindle 28 connected through the rubber buffer 29 or other resilient means to a non-rotating hub part 30 which is pivoted at 9. The axis of the rubber buffer system 29 is inclined somewhat upwardly and rearwardly so that in operation under taxying conditions the front end track bearing roller can yield rearwardly and upwardly to give the leading end of the endless track element enough flexibility for lift to enable it to run over any obstacles normally likely to be encountered in taxying conditions.

In operation the landing element is in the position in which it is seen in Figure 1 when the aircraft comes in to land, and in the initial touching down the tail end of the landing element swings up in an anti-clockwise direction about the pivot 7 with consequent closure of the damped compression strut 26 thus dissipating the energy imposed by the landing load. The landing element is then levelled out into the position in which it is seen in Figure 3 in which landing and taxying loads are taken by distortion of the frame defined by the front end track bearing roller 10, the rear end track bearing roller 15 and the track loading rollers 11 and 21, against the resilient resistance imposed by the shock absorbers 13 and 19. As has previously been stated the roller 25 operates for tensioning purposes to take up any stretch or any slack which may develop in the track band as a result of deformation of the frame, while additionally the leading end of the track unit is free to lift to clear any obstacles on the runway or landing surface by lifting of the roller against the resilience imposed by the rubber buffer system 29.

Although in the construction illustrated in the drawings the frame 8 and the endless track landing element has been shown pivotally connected at the bottom of the retractable shrut, it should be understood that such a layout is consistent with modern design technique where provision has been made for airscrew ground clearance. In later developments with contra-rotating airscrews or with the employment of jet propulsion units the lack of necessity for airscrew ground clearance may make it possible to dispense with any substantial length of strut in the mounting 4, and in such cases the frame 8 may be pivoted direct on to the air-frame to level out under the influence of landing load against the resistance imposed by the damped telescopic compression strut 26 operating between the frame 8 and any convenient fixed anchorage on the aircraft structure. In such cases complete retraction of the endless track landing element into the skin of the aircraft may be unnecessary, and it will suffice for retraction to compress the strut 26 from an available source of fluid pressure or other convenient means by which it can also be extended into the tail down position ready for landing.

It is an important feature of the invention that the tail end of the endless track landing element is disposed downwardly and in trail of the pivot 7. Such a disposition ensures that under the influence of landing load there is an upward swinging of the tail end of the endless track landing element giving a component of rearward movement which not only facilitates speeding up of the track on contact with the ground but at the same time gives a rearward component of yield comparable with that achieved on touching down of a low-pressure pneumatic tyre.

The track bearing rollers and the track loading rollers may be covered with resilient material to prevent excessive cutting of the track band by sharp stones on a concrete or other hard landing surface and in order to prevent lateral disengagement of the track band 24 from the rollers, the periphery of the rollers and the interior surface of the track band are circumferentially fluted complementarily. The practice prevailing at the present time generally calls for at least three landing elements, comprising two main laterally spaced main landing elements, one at each side of the longitudinal axis of the aircraft, and an auxiliary landing element spaced rearwardly or forwardly of the main landing elements and in line with the longitudinal axis of the aircraft, but proper design and installation of endless track landing elements makes it possible to dispense with the auxiliary landing element and in many cases a single endless track landing element may be employed to provide both the lateral and longitudinal stability required under normal landing conditions.

I claim:

1. In aircraft alighting gear, a frame arranged intermediate its ends for pivotal mounting upon and for tilting in the pitching sense relative to the aircraft structure, a roller pivotally and resiliently mounted upon the forward end of said frame, a second roller mounted adjacent the rear end of said frame for movement with and relative to the frame, an endless track band encircling said frame and guided by said rollers for running thereabout as a result of ground contact, and a resilient compression strut reacting between said rear roller and the frame's mounting, to resist ground-contact stresses and to bias the frame's rear end downwardly in trail when the aircraft is airborne.

2. In aircraft alighting gear, a frame arranged intermediate its ends for pivotal mounting upon and for tilting in the pitching sense relative to the aircraft structure, a roller pivotally and resiliently mounted upon the forward end of said frame, a second roller mounted adjacent the rear end of said frame for movement with and relative to the frame, an endless track band encircling said frame and guided by said rollers for running thereabout as a result of ground contact, resilient means reacting between the rear roller and the frame to absorb a part of ground-contact stresses, and further resilient means reacting between the frame and its mounting to resist the remainder of the ground-contact stresses, and to bias downwardly the frame's rear end when the aircraft is airborne.

3. In aircraft alighting gear, a frame arranged intermediate its ends for pivotal mounting upon and for tilting in the pitching sense relative to the aircraft structure, a roller pivotally and resiliently mounted upon the forward end of said frame, a second roller mounted adjacent the rear end of said frame for movement with and relative to the frame, an endless track band encircling said frame and guided by said rollers for running thereabout as a result of ground contact, track band tightening rollers, means resiliently mounting the same from the frame, and urging them against the band, resilient means reacting between the rear band-guiding roller and the frame to absorb a part of ground-contact stresses, and further resilient means reacting between the frame and its mounting to resist the remainder of the ground-contact stresses.

4. In aircraft alighting gear, a frame arranged intermediate its ends for pivotal mounting upon and for tilting in the pitching sense relative to the aircraft structure whereon it is mounted, a roller pivotally mounted upon the forward end of said frame, a lever pivotally mounted upon a transverse axis at the rear end of said frame, a second roller mounted upon said lever, an endless track band encircling said frame and mounted upon said rollers for running thereabout as a result of ground contact, a track band tightening roller engaging the band, a lever pivoted upon the frame, whereon said tightening roller is mounted, and resilient means reacting between the levers which mount, respectively, the rear guiding roller and said tightening roller, to maintain the band taut and to resist at least part of the ground-contact stresses.

5. In aircraft alighting gear, a frame arranged intermediate its ends for pivotal mounting upon and for tilting in the pitching sense relative to the aircraft structure whereon it is mounted, a roller pivotally mounted upon the forward end of said frame, a lever pivotally mounted upon a transverse axis at the rear end of said frame, a second roller mounted upon said lever, an endless track band encircling said frame and mounted upon said rollers for running thereabout as a result of ground contact, a track band tightening roller engaging the band, a lever pivoted upon the frame, whereon said tightening roller is mounted, and resilient means reacting between the levers which mount, respectively, the rear guiding roller and said tightening roller, to maintain the band taut and to resist at least part of the ground-contact stresses, and further resilient means reacting between said rear roller mounting lever and the frame's mounting, to resist a part of the ground-contact stresses, and to bias the frame downwardly at its rear end when the aircraft is airborne.

6. In aircraft alighting gear, a longitudinally disposed frame, means mounted thereon at front and rear for support of rollers, front and rear track-band mounting rollers journaled upon the respective roller-supporting means, an endless track band mounted upon and running about said rollers, and resilient means constraining said front roller to movement, relative to the frame, in a direction generally rearwardly and upwardly relative to the horizontal when ground-borne.

GEORGE H. DOWTY.

REFERENCES CITED

The following references are of record in the file of this patent:

UNITED STATES PATENTS

| Number | Name | Date |
|---|---|---|
| 2,416,183 | Kraft | Feb. 18, 1947 |
| 2,326,020 | Dowty | Aug. 3, 1943 |

FOREIGN PATENTS

| Number | Country | Date |
|---|---|---|
| 572,799 | France | Feb. 28, 1924 |

OTHER REFERENCES

The disclosure on page 12 of "Richmond Times-Dispatch" newspaper for July 24, 1943, of a Caterpillar landing gear.